(12) United States Patent
Chang (10) Patent No.: US 9,746,598 B2
(45) Date of Patent: Aug. 29, 2017

(54) OPTICAL FIBER LIGHT-GUIDE DEVICE AND BACKLIGHT MODULE (71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 207 days.

(21) Appl. No.: 14/754,301

(22) Filed: Jun. 29, 2015

(65) Prior Publication Data

US 2016/0313484 A1 Oct. 27, 2016

(30) Foreign Application Priority Data

Apr. 27, 2015 (CN) .......................... 2015 1 0203799

(51) Int. Cl.
*F21V 7/04* (2006.01)
*F21V 8/00* (2006.01)

(52) U.S. Cl.
CPC ........... *G02B 6/001* (2013.01); *G02B 6/0003* (2013.01); *G02B 6/0035* (2013.01); *G02B 6/0051* (2013.01); *G02B 6/0053* (2013.01); *G02B 6/0055* (2013.01)

(58) Field of Classification Search
CPC .... G02B 6/005; G02B 6/0028; G02B 6/0091; G02B 6/0031; G02B 6/0036; G02B 6/0051; G02B 6/0055; G02B 6/0013; G02B 6/0076; G02B 6/0053; G02B 6/0003; G02B 6/0035; G02B 6/001
USPC .......................... 362/558, 611; 385/115, 123
See application file for complete search history.

(56) References Cited

U.S. PATENT DOCUMENTS

| | | | | |
|---|---|---|---|---|
| 5,781,679 A * | 7/1998 | Li | ......................... | G02B 6/2817 385/123 |
| 6,307,987 B1 * | 10/2001 | Wang | ......................... | G02F 2/02 250/484.4 |
| 2001/0038539 A1 * | 11/2001 | Lea | ......................... | G02B 6/001 362/551 |
| 2002/0003824 A1 * | 1/2002 | Lo | ......................... | H01S 5/18 372/50.23 |
| 2006/0098912 A1 * | 5/2006 | Fukuyama | ........... | G02B 6/4246 385/14 |
| 2016/0077272 A1 * | 3/2016 | Lu | ......................... | G02B 6/0001 362/611 |
| 2016/0139324 A1 * | 5/2016 | Yagi | ..................... | G02B 6/0055 362/611 |

* cited by examiner

*Primary Examiner* — Laura Gudorf
(74) *Attorney, Agent, or Firm* — Steven Reiss (57) ABSTRACT

An optical fiber light-guide device for a backlight module includes an optical fiber. The optical fiber includes a core and a cladding layer surrounding the core. The optical fiber defines an inclined groove through an outer surface of the cladding layer, the inclined groove has at least one first end and a second end located along a length of the optical fiber, a depth of the groove gradually increases from each first end to the second end.

14 Claims, 7 Drawing Sheets

OPTICAL FIBER LIGHT-GUIDE DEVICE AND BACKLIGHT MODULE

FIELD

The subject matter herein generally relates to an optical fiber light-guide device and a backlight module having the optical fiber light-guide device.

BACKGROUND

Backlight modules usually include light sources and optical fibers for guiding incident light from the light sources. Typically, such an optical fiber includes a first end adjacent to the light source and an opposite second end. Incident light from the light source can enter the first end and be guided out from the second end.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

Figure 1:
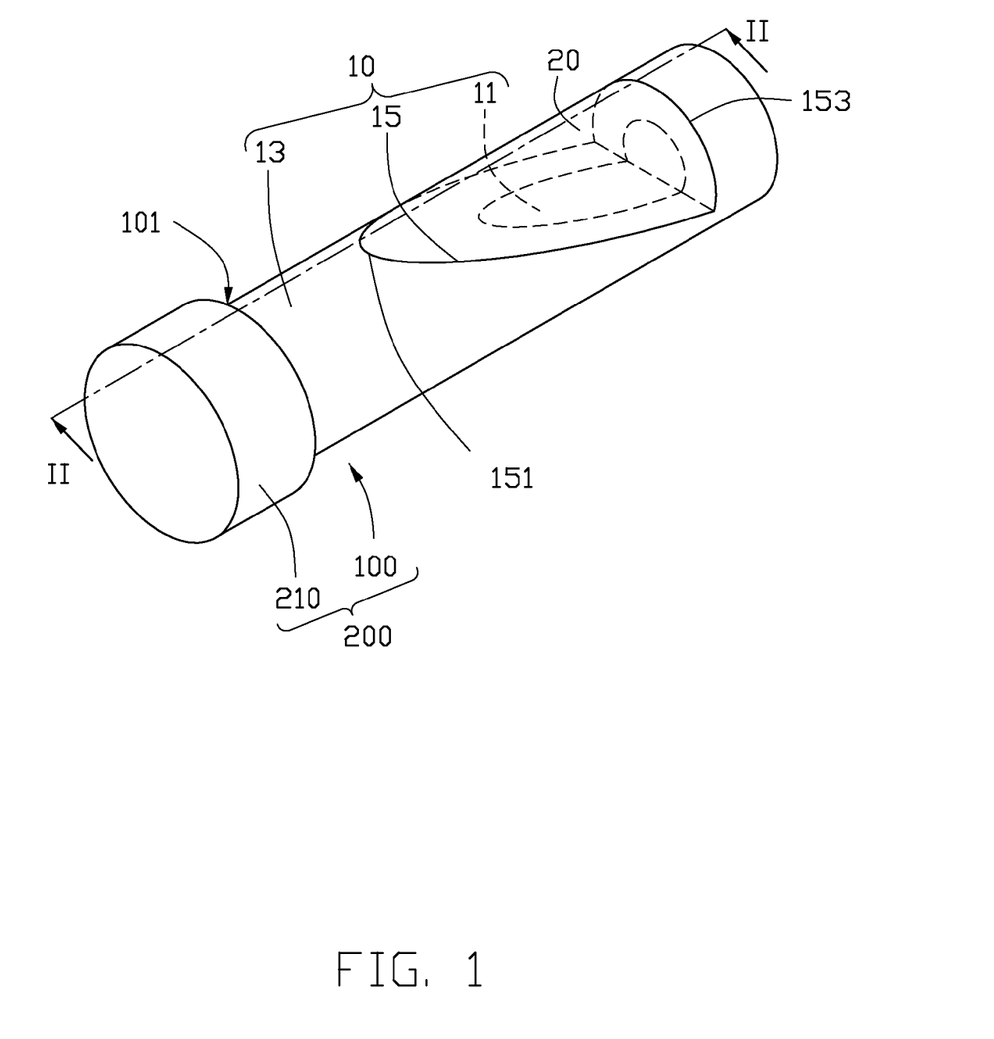
FIG. 1 is an isometric view of a first embodiment of a backlight module.

FIG. 1 illustrates a first embodiment of a backlight module 200. The backlight module 200 includes an optical fiber light-guide device 100 and at least one incident light source 210. The optical fiber light-guide device 100 includes an optical fiber 10. The optical fiber 10 has a diameter of about 375 µm to about 500 µm. Each of the at least one incident light source 210 is adjacent to one light incident end 101 of the optical fiber 10.

The optical fiber 10 includes a core 11 and a cladding layer 13 surrounding the core 11. The core 11 has a diameter of about 125 µm to about 350 µm. The cladding layer 13 can be made of a polymer. The optical fiber 10 defines an inclined groove 15 through an outer surface 131 of the cladding layer 13. The inclined groove 15 has at least one first end 151 and a second end 153 located along a extension direction of the optical fiber 10. Each first end 151 is adjacent to one incident light source 210, and is located between the corresponding incident light source 210 and the second end 153. A depth of the groove 15 gradually increases from each first end 151 to the second end 153, causing a portion of the cladding layer 13 defining the groove 15 to be thinner than other portions of the cladding layer 13.

When in use, incident light emitted from the incident light source 210 enters and passes through the core 11 of the optical fiber 10, and is guided out from the groove 15. Since the portion of the cladding layer 13 defining the groove 15 is thinner than other portions of the cladding layer, more incident light entering the optical fiber 10 can be guided out from the cladding layer 13 defining the groove 15. Furthermore, since an energy loss may exist while the incident light is passing through the optical fiber 10, the energy of the incident light guided out from the groove 15 may be gradually reduced from each first end 151 to the second end 153. However, since the depth of the groove 15 increases from each first end 151 to the second end 153, the incident light entering the optical fiber 10 can be uniformly guided out from the cladding layer 13 defining the groove 15. In this embodiment, the groove 15 is defined by laser cutting. The depth of the groove 15 step increases from each first end 151 to the second end 153.

More specifically, in the first embodiment, the backlight module 200 includes only one incident light source 210. The groove 15 includes only one first end 151 adjacent to the incident light source 210. A depth of the second end 153 of the groove 15 is greater than the thickness of the cladding layer 13, thereby destroying a total internal reflection path of the incident light entering the optical fiber 10. Furthermore, the depth of the second end 153 is greater than a radius of the optical fiber 10, namely, the depth of the second end 153 of the groove 15 is greater than a sum of the thickness of the cladding layer 13 and the radius of the core 11. As such, more incident light entering the optical fiber 10 can be guided out from the groove 15. Moreover, the depth of the second end 153 of the groove 15 is equal to or is less than a sum of the thickness of the cladding layer 13 and the diameter of the core 11, thereby preventing the incident light entering the optical fiber 10 from being guided out other portions of the cladding layer 13.

Figure 2:
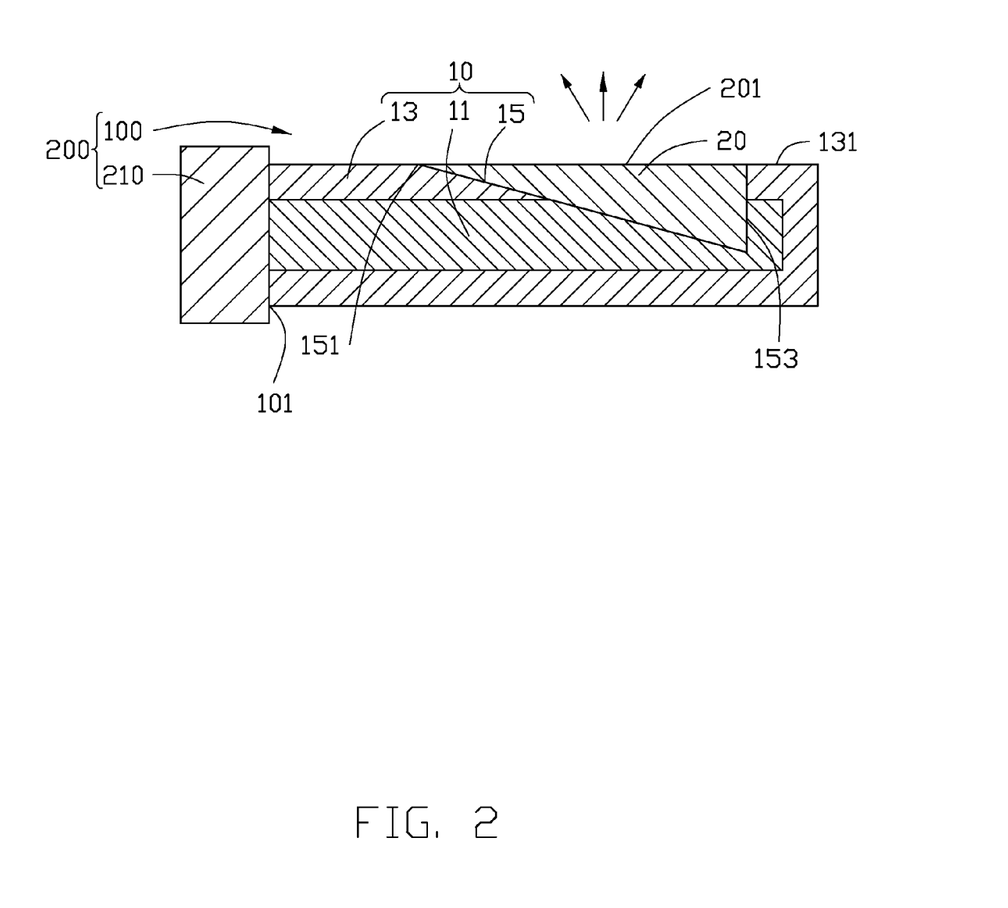
FIG. 2 is a cross-sectional view taken along line II-II of FIG. 1.

FIG. 2 illustrates that the optical fiber light-guide device 100 further includes a fluorescent layer 20 formed in the groove 15. The groove 15 can be filled with the fluorescent layer 20. A refractive index of the fluorescent layer 20 should be between a refractive index of the core 11 and a refractive index of the cladding layer 13. More specifically, the refractive index of the fluorescent layer 20 is nearly equal to the refractive index of the core 11. A surface 201 of the fluorescent layer 20 away from the core 11 is aligned with the outer surface 131 of the cladding layer 13. The fluorescent layer 20 is made of photo-luminescent material. The photo-luminescent material can be selected from a group consisting of quantum dot nanoparticles, organic luminescent material, rare earth luminescent phosphor and up-conversion phosphor. In this embodiment, the photoluminescent material is quantum dot nanoparticles. The incident light entering the optical fiber 10 presents a desired color when being guided out from the fluorescent layer 20.

Figure 3:
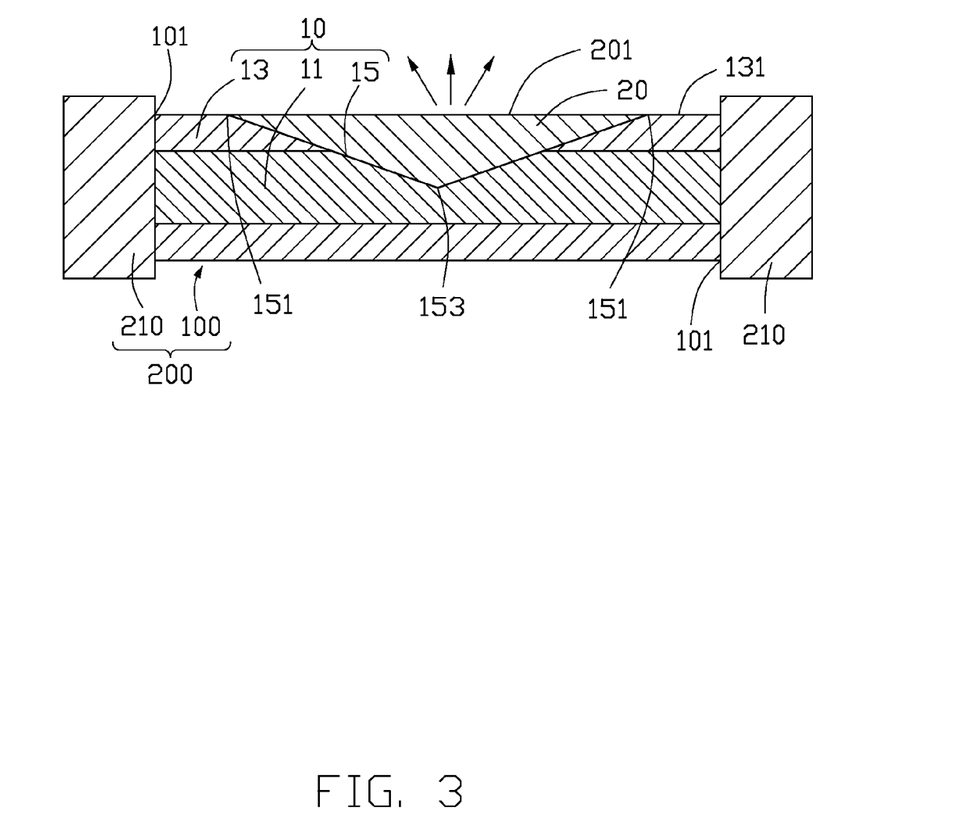
FIG. 3 is similar to FIG. 2, but showing a second embodiment of the backlight module.

FIG. 3 illustrates a second embodiment of a backlight module 200. Unlike the first embodiment, the backlight module 200 includes two incident light sources 210 respectively adjacent to two opposite ends of the optical fiber 10. The groove 15 includes two first ends 151 each adjacent to one incident light source 210, and a second end 153 located between the two first ends 151. The depth of the groove 15 gradually increases from each first end 151 of the optical fiber 10 to the second end 153 of the optical fiber 10. In this embodiment, the incident light entering the optical fiber 10 can be uniformly guided out from the groove 15.

Figure 4:
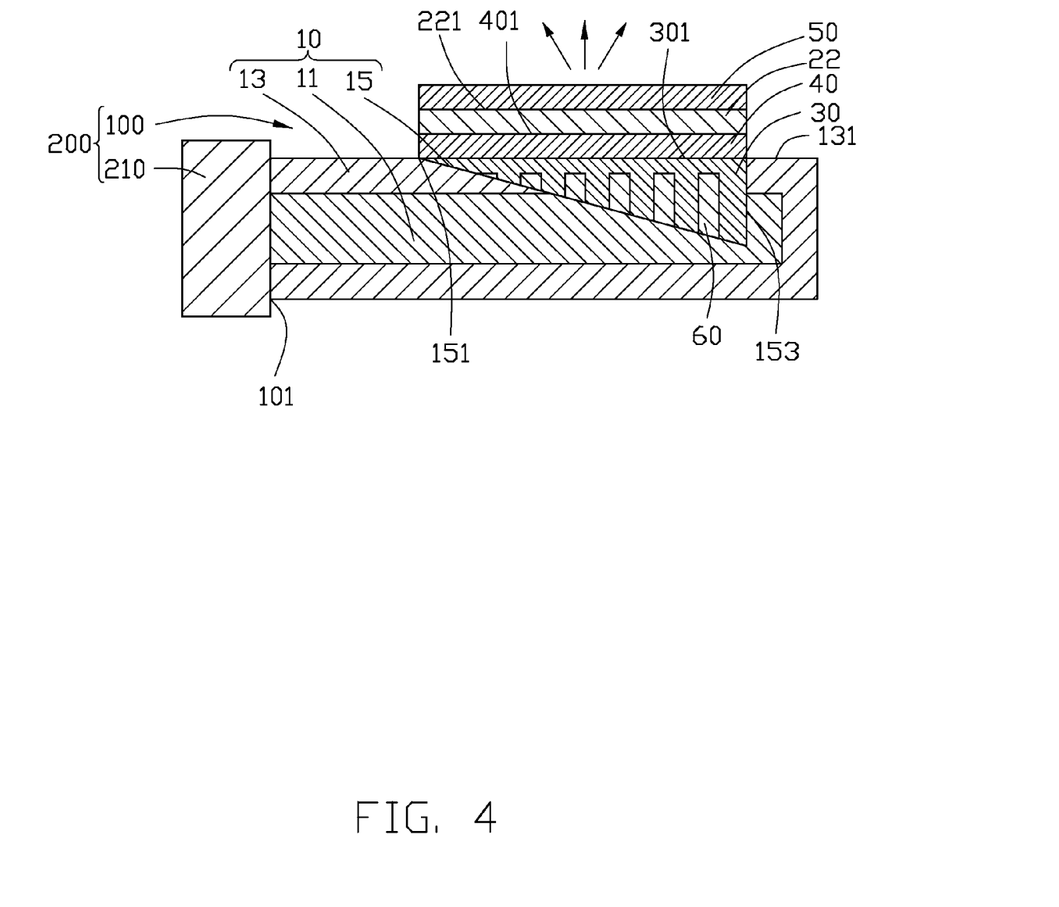
FIG. 4 is similar to FIG. 2, but showing a third embodiment of the backlight module.

FIG. 4 illustrates a third embodiment of a backlight module 200. Unlike the first embodiment, the groove 15 can be filled with a glue layer 30 instead of the fluorescent layer 20. A surface 301 of the glue layer 30 away from the core 11 is aligned with the outer surface 131 of the cladding layer 13. A refractive index of the glue layer 30 should be between the refractive index of the core 11 and the refractive index of the cladding layer 13. More specifically, the refractive index of the glue layer 30 is nearly equal to the refractive index of the core 11. The incident light entering the optical fiber 10 is guided out from the glue layer 30 after passing through the core 11 and the cladding layer 13.

The optical fiber light-guide device 100 can further include a diffusion layer 40 formed on the surface 301 of the glue layer 30 away from the core 11. The diffusion layer 40 has a thickness of about 30 μm to about 200 μm. The diffusion layer 40 is configured to diffuse the incident light guided out from the glue layer 30, to form a planar light source when being guided out from the diffusion layer 40. The diffusion layer 40 is made of a material selected from a group consisting of polypropylene (PP), polyethylene terephthalate (PET), polycarbonate (PC) and polymethyl methacrylate (PMMA).

The optical fiber light-guide device 100 can further include a fluorescent layer 22 formed on a surface 401 of the diffusion layer 40 away from the glue layer 30. The fluorescent layer 22 has a thickness of about 30 μm to about 200 μm. The fluorescent layer 22 has the same features as the fluorescent layer 20 in the first embodiment.

The optical fiber light-guide device 100 can further include a brightness enhancement film 50 formed on a surface 221 of the fluorescent layer 22 away from the diffusion layer 40. The brightness enhancement film 50 has a thickness of about 30 μm to about 200 μm. The brightness enhancement film 50 is configured to direct the incident light guided from the fluorescent layer 22 to a desired direction, thereby enhancing a luminance efficiency of the optical fiber light-guide device 100.

The optical fiber light-guide device 100 can further include an optical grate 60 formed at a bottom of the groove 15. The optical grate 60 is configured to change a direction of the incident light when the incident light is guided out from the bottom of the groove 15, causing more incident light to be guided out from the groove 15 of the optical fiber light-guide device 100. The optical grate 60 can be replaced by a number of three-dimensional relief patterns formed at the bottom of the groove 15.

Figure 5:
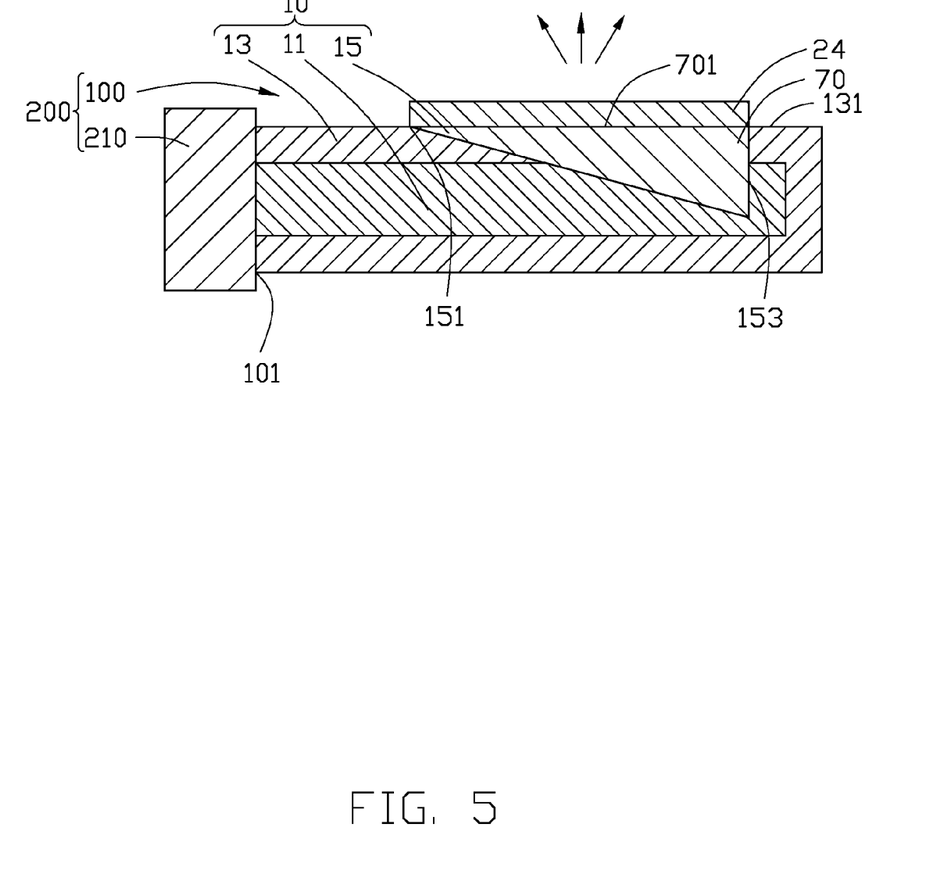
FIG. 5 is similar to FIG. 2, but showing a fourth embodiment of the backlight module.

FIG. 5 illustrates a forth embodiment of a backlight module 200. Unlike the first embodiment, the groove 15 is filled with a diffusion adhesive layer 70 instead of the fluorescent layer 20. A surface 701 of the diffusion adhesive layer 70 away from the core 11 is aligned with an outer surface 131 of the cladding layer 13. A refractive index of the diffusion adhesive layer 70 should be between the refractive index of the core 11 and the refractive index of the cladding layer 13. More specifically, the refractive index of the diffusion adhesive layer 70 is nearly equal to the refractive index of the core 11. The diffusion adhesive layer 70 includes a number of adhesive particles for diffusing the incident light guided out from the diffusion adhesive layer 70. The diffusion adhesive layer 70 can have the same features as the diffusion layer 40 in the third embodiment.

The optical fiber light-guide device 100 further includes a fluorescent layer 24 formed on a surface 701 of the diffusion adhesive layer 70 away from the core 11. The fluorescent layer 24 has a thickness of about 30 μm to about 200 μm. The fluorescent layer 24 has the same features as the fluorescent layer 20 in the first embodiment.

Figure 6:
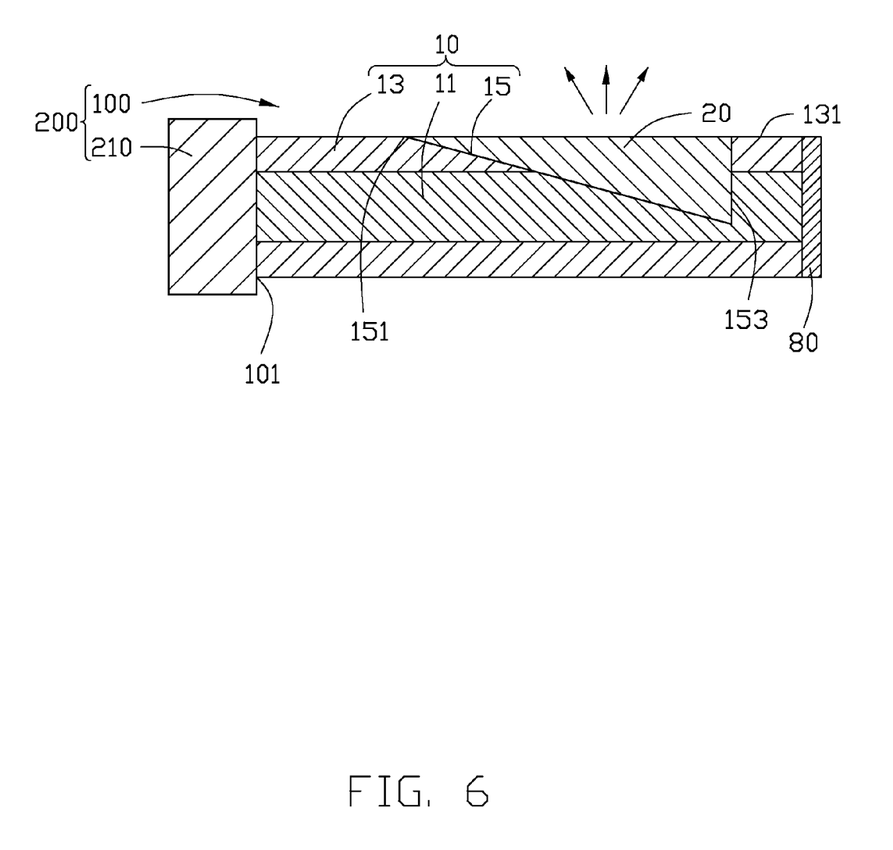
FIG. 6 is similar to FIG. 2, but showing a fifth embodiment of the backlight module.

FIG. 6 illustrates a fifth embodiment of a backlight module 200. Unlike the first embodiment, the optical fiber light-guide device 100 can further include a reflective coating 80 formed at the end of the optical fiber 10 away from the incident light source 210. The reflective coating 80 can be made of aluminum. The reflective coating 80 can effectively reflect near-ultraviolet light, visible light, and near-infrared light. The reflective coating 80 can reflect the incident light which is not guided out from the groove 15 towards the groove 15, to cause more incident light to be guided out from the groove 15, thereby increasing the luminance efficiency of the optical fiber light-guide device 100.

Figure 7:
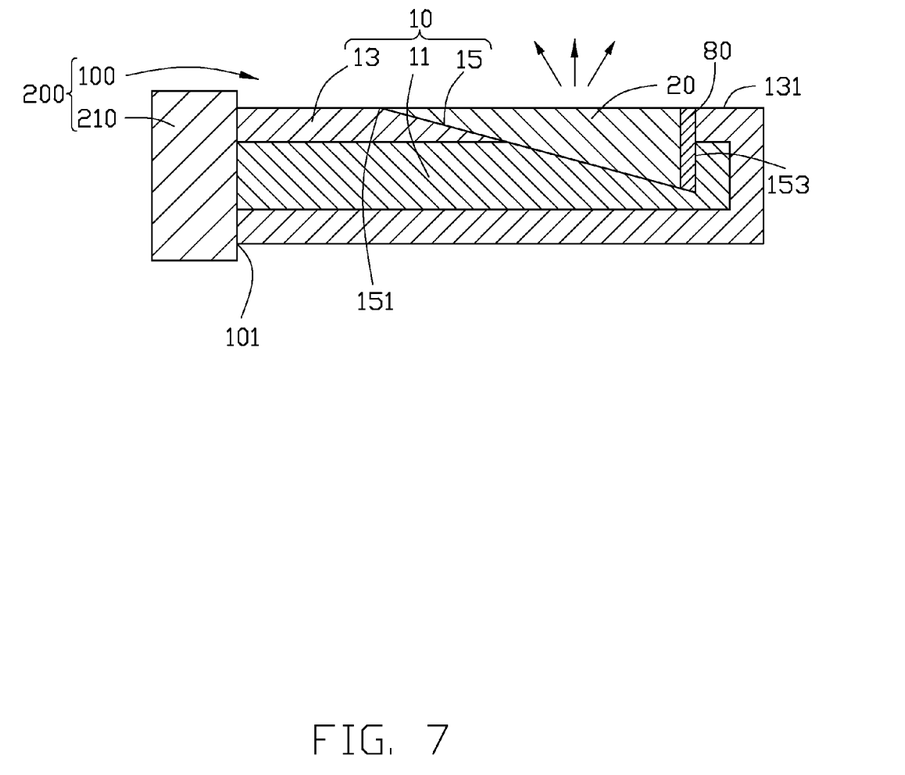
FIG. 7 is similar to FIG. 2, but showing a sixth embodiment of the backlight module.

FIG. 7 illustrates a sixth embodiment of a backlight module 200. The optical fiber light-guide device 100 can further include a reflective coating 90 formed on a second end 153 of the groove 15. The reflective coating 90 can have the same features as the reflective coating 90 in the fifth embodiment.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An optical fiber light-guide device comprising:
    an optical fiber comprising:
        a core; and
        a cladding layer surrounding the core; and
    a glue layer;
    wherein the optical fiber has at least one light incident end, the optical fiber defines an inclined groove through an outer surface of the cladding layer, the inclined groove has at least one first end and a second end located along an extension direction of the optical fiber, each first end is adjacent to one light incident end, a depth of the groove gradually increases from each first end to the second end;
    wherein the glue layer is formed in the groove; a surface of the glue layer away from the core is aligned with the outer surface of the cladding layer; the incident light entering the optical fiber is guided out from the glue layer after passing through the core and the cladding layer;
    wherein a diffusion layer is formed on the surface of the glue layer; the diffusion layer is configured to diffuse the incident light guided out from the glue layer, to form a planar light source when being guided out from the diffusion layer; and wherein a fluorescent layer is formed on a surface of the diffusion layer away from the glue layer; the fluorescent layer is made of photo-luminescent material; the photo-luminescent material is selected from a group consisting of quantum dot nanoparticles, organic luminescent material, rare earth luminescent phosphor and up-conversion phosphor; the fluorescent layer has a thickness of about 30 μm to about 200 μm.

2. The optical fiber light-guide device of claim 1, wherein a brightness enhancement film is formed on a surface of the fluorescent layer away from the diffusion layer; the brightness enhancement film has a thickness of about 30 μm to about 200 μm.

3. The optical fiber light-guide device of claim 2, further comprising an optical grate, wherein the optical grate is formed at a bottom of the groove; the optical grate is configured to change a direction of the incident light when the incident light is guided out from the bottom of the groove, causing more incident light to be guided out from the groove of the optical fiber light-guide device.

4. The optical fiber light-guide device of claim 1, further comprising a diffusion adhesive layer, wherein the diffusion adhesive layer is formed in the groove; a surface of the diffusion adhesive layer away from the core is aligned with the outer surface of the cladding layer; the diffusion adhesive layer comprises a plurality of adhesive particles for diffusing the incident light guided out from the diffusion adhesive layer.

5. The optical fiber light-guide device of claim 4, wherein a fluorescent layer is formed on the surface of the diffusion adhesive layer; the fluorescent layer is made of photo-luminescent material; the photo-luminescent material is selected from a group consisting of quantum dot nanoparticles, organic luminescent material, rare earth luminescent phosphor and up-conversion phosphor; the fluorescent layer has a thickness of about 30 μm to about 200 μm.

6. The optical fiber light-guide device of claim 1, further comprising a reflective coating, wherein the reflective coating is formed at an end of the optical fiber; the reflective coating is made of aluminum.

7. The optical fiber light-guide device of claim 1, further comprising a reflective coating, wherein the reflective coating is formed on the second end of the groove; the reflective coating is made of aluminum.

8. A backlight module comprising:
at least one incident light source; and
an optical fiber light-guide device comprising:
   an optical fiber comprising:
      a core; and
      a cladding layer surrounding the core; and
   a glue layer;
wherein each incident light source is adjacent to one end of the optical fiber, the optical fiber defines an inclined groove through an outer surface of the cladding layer, the inclined groove has at least one first end and a second end located along an extension direction of the optical fiber, a depth of the groove gradually increases from each first end to the second end;

wherein the glue layer is formed in the groove; a surface of the glue layer away from the core is aligned with the outer surface of the cladding layer; the incident light entering the optical fiber is guided out from the glue layer after passing through the core and the cladding layer;

wherein a diffusion layer is formed on the surface of the glue layer; the diffusion layer is configured to diffuse the incident light guided out from the glue layer, to form a planar light source when being guided out from the diffusion layer; and wherein a fluorescent layer is formed on a surface of the diffusion layer away from the glue layer; the fluorescent layer is made of photo-luminescent material; the photo-luminescent material is selected from a group consisting of quantum dot nanoparticles, organic luminescent material, rare earth luminescent phosphor and up-conversion phosphor; the fluorescent layer has a thickness of about 30 μm to about 200 μm.

9. The backlight module of claim 8, wherein a brightness enhancement film is formed on a surface of the fluorescent layer away from the diffusion layer; the brightness enhancement film has a thickness of about 30 μm to about 200 μm.

10. The backlight module of claim 9, further comprising an optical grate, wherein the optical grate is formed at a bottom of the groove; the optical grate is configured to change a direction of the incident light when the incident light is guided out from the bottom of the groove, causing more incident light to be guided out from the groove of the optical fiber light-guide device.

11. The backlight module of claim 8, further comprising a diffusion adhesive layer, wherein the diffusion adhesive layer is formed in the groove; a surface of the diffusion adhesive layer away from the core is aligned with the outer surface of the cladding layer; the diffusion adhesive layer comprises a plurality of adhesive particles for diffusing the incident light guided out from the diffusion adhesive layer.

12. The backlight module of claim 11, wherein a fluorescent layer is formed on the surface of the diffusion adhesive layer; the fluorescent layer is made of photo-luminescent material; the photo-luminescent material is selected from a group consisting of quantum dot nanoparticles, organic luminescent material, rare earth luminescent phosphor and up-conversion phosphor; the fluorescent layer has a thickness of about 30 μm to about 200 μm.

13. The backlight module of claim 8, further comprising a reflective coating, wherein the reflective coating is formed at an end of the optical fiber; the reflective coating is made of aluminum.

14. The backlight module of claim 8, further comprising a reflective coating, wherein the reflective coating is formed on the second end of the groove; the reflective coating is made of aluminum.

* * * * *